US010719509B2

(12) United States Patent
Kumar et al.

(10) Patent No.: US 10,719,509 B2
(45) Date of Patent: Jul. 21, 2020

(54) HIERARCHICAL QUANTIZATION FOR FAST INNER PRODUCT SEARCH

(71) Applicant: GOOGLE INC., Mountain View, CA (US)

(72) Inventors: Sanjiv Kumar, Jericho, NY (US); David Morris Simcha, Jersey City, NJ (US); Ananda Theertha Suresh, New York, NY (US); Ruiqi Guo, Elmhurst, NY (US); Xinnan Yu, Forest Hills, NY (US); Daniel Holtmann-Rice, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 15/290,198

(22) Filed: Oct. 11, 2016

(65) Prior Publication Data

US 2018/0101570 A1  Apr. 12, 2018

(51) Int. Cl.
*G06F 16/2453* (2019.01)
*G06F 16/28* (2019.01)
(Continued)

(52) U.S. Cl.
CPC .... *G06F 16/24537* (2019.01); *G06F 16/2237* (2019.01); *G06F 16/24578* (2019.01);
(Continued)

(58) Field of Classification Search
CPC .............. G06F 17/30454; G06F 17/10; G06F 17/3069; G06F 17/30324; G06F 17/30598; G06F 17/30705; G06F 17/3053
See application file for complete search history.

(56) References Cited

U.S. PATENT DOCUMENTS 5,194,950 A * 3/1993 Murakami .............. G06T 9/008
375/240.16
5,677,986 A * 10/1997 Amada .................. G06T 9/008
348/422.1
(Continued)

OTHER PUBLICATIONS

Elsayed, et al., "Pairwise Document Similarity in Large Collections With MapReduce"; Proceedings of ACL-08: HLT, Short Papers (Companion Volume), Jun. 2008; pp. 265-268.
(Continued)

*Primary Examiner* — Belix M Ortiz Ditren
*Assistant Examiner* — Aryan D Toughiry
(74) *Attorney, Agent, or Firm* — Brake Hughes Bellermann LLP

(57) ABSTRACT

Implementations provide an efficient system for calculating inner products between high-dimensionality vectors. An example method includes clustering database items represented as vectors, selecting a cluster center for each cluster, and storing the cluster center as an entry in a first layer codebook. The method also includes, for each database item, calculating a residual based on the cluster center for the cluster the database item is assigned to and projecting the residual into subspaces. The method also includes determining, for each of the subspaces, an entry in a second layer codebook for the subspace, and storing the entry in the first layer codebook and the respective entry in the second layer codebook for each of the subspaces as a quantized vector for the database item. The entry can be used to categorize an item represented by a query vector or to provide database items responsive to a query vector.

20 Claims, 9 Drawing Sheets

(51) Int. Cl.
| | |
|---|---|
| G06F 16/22 | (2019.01) |
| G06F 16/2457 | (2019.01) |
| G06F 17/10 | (2006.01) |
| G06K 9/62 | (2006.01) |
| G06F 16/33 | (2019.01) |
| G06F 16/35 | (2019.01) |

(52) U.S. Cl.
CPC ........ *G06F 16/285* (2019.01); *G06F 16/3347* (2019.01); *G06F 16/35* (2019.01); *G06F 17/10* (2013.01); *G06K 9/6219* (2013.01); *G06K 9/6223* (2013.01); *G06K 9/6272* (2013.01)

(56) References Cited

U.S. PATENT DOCUMENTS

| | | | | |
|---|---|---|---|---|
| 6,081,274 | A * | 6/2000 | Shiraishi | G06T 15/80 345/426 |
| 6,404,925 | B1 * | 6/2002 | Foote | G06K 9/00758 382/224 |
| 7,007,019 | B2 * | 2/2006 | Kanno | G06F 16/338 |
| 7,152,065 | B2 | 12/2006 | Behrens et al. | |
| 8,077,994 | B2 | 12/2011 | Zhang et al. | |
| 10,255,323 | B1 | 4/2019 | Guo et al. | |
| 2002/0178158 | A1 * | 11/2002 | Kanno | G06F 16/338 |
| 2004/0220944 | A1 | 11/2004 | Behrens et al. | |
| 2007/0263746 | A1 * | 11/2007 | Son | H04L 1/0618 375/267 |
| 2009/0304296 | A1 * | 12/2009 | Zhang | G06K 9/6217 382/243 |
| 2011/0080965 | A1 * | 4/2011 | Liu | H04L 25/0224 375/260 |
| 2014/0016698 | A1 * | 1/2014 | Joshi | H04N 19/88 375/240.12 |
| 2014/0258295 | A1 | 9/2014 | Wang et al. | |
| 2016/0148120 | A1 | 5/2016 | Takahashi | |
| 2016/0259816 | A1 * | 9/2016 | Song | G16H 10/60 |
| 2017/0026665 | A1 * | 1/2017 | Duan | G06K 9/4671 |
| 2018/0341805 | A1 * | 11/2018 | Jain | G06F 16/532 |

OTHER PUBLICATIONS

Spyromitros-Xioufis, et al., "A Comprehensive Study Over VLAD and Product Quantization in Large-Scale Image Retrieval", IEEE Transactions on Multimedia, IEEE Service Center, vol. 16, No. 6, Oct. 2014, pp. 1713-1728.
Shicong, et al., "Learning Better Encoding for Approximate Nearest Neighbor Search with Dictionary Annealing", retrieved from https://ai2-s2-pdfs.s3.amazonaws.com/9e8b/2623b432250733479265fdeaa819b7a55b35.pdf, Jul. 6, 2015, 10 pages.
Gersho, et al., "Chapter 12—Constrained Vector Quantization", The Springer International Series in Engineering and Computer Science (Communications and Information Theory), vol. 159, Springer, Boston, MA, 1992, pp. 407-485.
International Search Report and Written Opinion for PCT Application No. PCT/US2017/052517, dated Nov. 6, 2017, 14 pages.
Andoni et al., "Near-Optimal Hashing Algorithms for Approximate Nearest Neighbor in High Dimensions", 47th Annual IEEE Symposium on Foundations of Computer Science, 2006, pp. 459-468.
Auvolat et al., "Clustering is Efficient for Approximate Maximum Inner Product Search", arXiv preprint arXiv:1507.05910, 2015, 10 pages.
Bachrach et al., "Speeding Up the Xbox Recommender System using a Euclidean Transformation for Inner-Product Spaces", In Proceedings of the 8th ACM Conference on Recommender Systems, 2014, pp. 257-265.
Bennet et al., "The Netflix Prize", In KDD Cup and Workshop in conjunction with KDD, Aug. 12, 2007, 4 Pages.
Bottou et al., "Convergence Properties of the K-means Algorithms", In Advances in Neural Information Processing Systems 7, 1994, pp. 585-592.
Halton, "A Combinatorial Proof of Cayley's Theorem on Pfaffians", Journal of Combinatorial Theory, vol. 1, 1966, pp. 224-232.
Cohen et al., "Approximating Matrix Multiplication for Pattern Recognition Tasks", Journal of Algorithms, vol. 30, Issue 2, 1999, pp. 211-252.
Cremonesi et al., "Performance of Recommender Algorithms on Top-N Recommendation Tasks", Proceedings of the Fourth ACM Conference on Recommender Systems, Sep. 2010, pp. 39-46.
Davidson et al., "The YoutTbe Video Recommendation System", Proceedings of the Fourth ACM Conference on Recommender Systems, Sep. 2010, pp. 293-296.
Dean et al., "Fast, Accurate Detection of 100,000 Object Classes on a Single Machine", Proceedings of IEEE Conference on Computer Vision and Pattern Recognition, 2013, 8 pages.
Du et al., "Inner Product Similarity Search Using Compositional Codes", CoRR,abs/1406.4966, Jun. 2014, pp. 1-20.
Fukunaga et al., "A Branch and Bound Algorithm for Computing K-Nearest Neighbors", IEEE Transactions on Computers vol. 100, No. 7, Jul. 1975, pp. 750-753.
Szegedy et al., "Going Deeper with Convolutions", arXiv:1409.4842, 2014, pp. 1-9.
Gong et al., "Iterative Quantization: A Procrustean Approach to Learning Binary Codes", Proceedings of the 2011 IEEE Conference on Computer Vision and Pattern Recognition (CVPR), 2011, pp. pp. 817-824.
Guo et al., "Quantization Based Fast Inner Product Search", arXiv preprint arXiv:1509.01469, 2015, 17 pages.
Jegou et al., "Product Quantization for Nearest Neighbor Search", IEEE Transactions on Pattern Analysis and Machine Intelligence, vol. 33, Issue 1, 2011, 14 pages.
Kingma et al., "Adam: A method for stochastic optimization", CoRR, abs/1412.6980, Jul. 2015, pp. 1-15.
Koenigstein et al., "Efficient Retrieval of Recommendations in a Matrix Factorization Framework", Proceedings of the 21st ACM International Conference on Information and Knowledge Management, Nov. 2012, pp. 535-544.
Mikolov et al., "Distributed Representations of Words and Phrases and Their Compositionality", In Advances in neural information processing systems, 2013, pp. 3111-3119.
Neyshabur et al., "A simpler and better LSH for Maximum Inner Product Search (MIPS)", arXiv:1410.5518, Oct. 2014, 9 Pages.
Nister et al., "Scalable Recognition with a Vocabulary Tree", Computer vision and pattern recognition, IEEE computer society conference, 2006, pp. 2161-2168.
Norouzi et al., "Cartesian k-Means", Computer Vision and Pattern Recognition (CVPR), IEEE Conference, 2013, pp. 3017-3024.
Ram et al., "Maximum Inner-Product Search Using Cone Trees", In SIGKDD International Conference on Knowledge Discovery and Data Mining, 2012, 9 pages.
Sabin et al., "Product Code Vector Quantizers for Waveform and Voice Coding", IEEE Transactions on Acoustics, Speech, and Signal Processing, 1984, pp. 474-488.
Shen et al., "Learning Binary Codes for Maximum Inner Product Search" In ICCV, 2015, pp. 4148-4156.
Shrivastava et al., "An Improved Scheme for Asymmetric LSH", arXiv:1410.5410, Oct. 2014, 10 pages.
Shrivastava et al., "Asymmetric LSH (ALSH) for Sublinear Time Maximum Inner Product Search (MIPS)", In Advances in Neural Information Processing Systems, 2014, pp. 2321-2329.
Kalantidis, et al., "Locally Optimized Product Quantization for Approximate Nearest Neighbor Search", Computer Vision Foundation, Jun. 2014, 8 pages.
Written Opinion for International Application PCT/US2017/052517, dated Jan. 14, 2019, 7 pages.
André, et al., "Cache locality is not enough: high-performance nearest neighbor search with product quantization fast scan", Proceedings of the VLDB Endowment 9.4, 2015, pp. 288-299.
Babenko, et al., "Efficient Indexing of Billion-Scale Datasets of Deep Descriptors", 2016 IEEE Conference on Computer Vision and Pattern Recognition (CVPR), pp. 2055-2063.

(56) References Cited

OTHER PUBLICATIONS

Bayardo, et al., "Scaling up all pairs similarity search", Proceedings of the 16th international conference on World Wide Web, May 2007, pp. 131-140.
Billsus, et al., "Learning Collaborative Information Filters", Proceedings of the Fifteenth International Conference on Machine Learning (ICML '98), 1998, pp. 46-54.
Cheng, et al., "Wide & Deep Learning for Recommender Systems", Proceedings of the 1st Workshop on Deep Learning for Recommender Systems (DLRS 2016), 2016, pp. 7-10.
Cover, et al., "Elements of Information Theory", 2nd Edition, Wiley-Interscience, Inc., 1991, 563 pages.
Ge, et al., "Optimized Product Quantization", IEEE Transactions on Pattern Analysis and Machine Intelligence 36.4, Apr. 2014, pp. 744-755.
Harper, et al., "The MovieLens Datasets: History and Context", ACM Transactions on Interactive Intelligent Systems 5.4, 2015, 20 pages.
Le, et al., "Distributed Representations of Sentences and Documents", Proceedings of the 31st International Conference on Machine Learning, vol. 32, 2014, pp. 1188-1196.
Ley, "The DBLP Computer Science Bibliography: Evolution, Research Issues, Perspectives", String Processing and Information Retrieval, 2002, pp. 1-10.
Lynch, "Big Data: How do your data grow?", Nature, vol. 455, Sep. 2008, pp. 28-29.
Martinez, et al., "Stacked Quantizers for Compositional Vector Compression", available on-line at <https://arxiv.org/pdf/1411.2173.pdf>, Nov. 8, 2014, 8 pages.
Moffat, et al., "Self-indexing inverted files for fast text retrieval", ACM Transactions on Information Systems (TOIS) 14(4), 1996, pp. 349-379.
Palangi, et al., "Deep Sentence Embedding Using Long Short-Term Memory Networks: Analysis and Application to Information Retrieval", IEEE/ACM Transactions on Audio, Speech and Language Processing. 24.4, Jan. 16, 2016, pp. 694-707.
Shan, et al., "Deep Crossing: Web-Scale Modeling Without Manually Crafted Combinatorial Features", Proceedings of the 22nd ACM SIGKDD International Conference on Knowledge Discovery and Data Mining, Aug. 13-17, 2016, pp. 255-262.
Wong, et al., "Implementations of partial document ranking using inverted files", Information Processing & Management 29.5, 1993, pp. 647-669.
Zobel, et al., "Inverted files for text search engines", ACM computing surveys (CSUR), vol. 38, No. 2, Article 6, Jul. 2006, 56 pages.

* cited by examiner

HIERARCHICAL QUANTIZATION FOR FAST INNER PRODUCT SEARCH

BACKGROUND

Many tasks involve computing the inner product of a query vector with a set of database vectors to find database instances having the largest, or maximum, inner products (e.g., highest similarity). This is a Maximum Inner Product Search (MIPS) problem. But computation of the inner products via a linear scan requires O(nd) time and memory, which is prohibitive when the number of database vectors (n) and the dimensionality (d) is large.

SUMMARY

Implementations provide a fast approximation of the inner product that is orders of magnitude faster than a brute-force method while retaining high accuracy and a small memory footprint. The method includes a hierarchical quantization of database items, the hierarchy including at least two layers. In some implementations, the first layer is vector quantization (VQ) and the second layer is product quantization (PQ). In some implementations the system may perform an orthogonal transformation on residuals between the quantization layers. In some implementations there may be several layers of vector quantization before product quantization. Other hierarchical combinations may be used. In one implementation, the system may quantize database vectors (e.g., database items represented in dense, high dimensional points in a vector space) via vector quantization. In other words, the database items may be clustered and a cluster center determined for each cluster and entered into a codebook (the VQ codebook or first-layer codebook). Each of the database items is then mapped to its respective cluster via a VQ code word which represents the corresponding entry in the VQ codebook. The system may then determine a residual for the database item, the residual being the difference between the cluster center that the database item is mapped to, i.e., the entry in the VQ codebook the item maps to, and the database vector. The residual has a much smaller diameter than the database items, which yields significant reductions in quantization error. The system may then transform the residuals via a learned transformation. The learned transformation lowers the variance within each subspace of product quantization, which substantially lowers quantization error and results in a higher recall. Finally the transformed residual may be submitted to product quantization, where each transformed residual is projected into subspaces and each subspace (or chunk) of the residual is assigned an entry in a PQ codebook (using a PQ code word) for the subspace. The PQ codebook may also be referred to as the second-layer codebook. In other words, for each subspace, clusters are generated and each transformed residual mapped to one of the clusters for the subspace. Each subspace has its own PQ code words (i.e., a different cluster assignment). The final quantized representation of the database item is a concatenation of the code words for each layer, e.g., an entry into a VQ codebook, and a PQ code word for each subspace. In implementations with additional layers, e.g., an additional vector quantization layer, the additional VQ code word would be concatenated after the first VQ code word. The VQ codebook and the PQ codebooks may be jointly learned with the transformation by minimizing quantization error over the database.

At query time, the system computes the inner product between the query vector and each of the VQ code words and the system selects one or more of the VQ code words that are most similar to the query based on the results of the inner product computation. The system may then compute the residual for the query, e.g., the difference between the query vector and the VQ code word most similar to the query. If more than one VQ code word is selected, the system may generate a residual query vector for each selected VQ code word. The system may then transform the residual query vector (or vectors) with the learned transformation. In some implementations, the system may submit the transformed residual to another layer (e.g., additional vector quantization). The system may project the transformed residual query vector into subspaces and compare the query vector projection to the quantized database entries that are mapped to the same VQ code word, one PQ subspace at a time. For example, the system may select any quantized database items with the same VQ code word and, for a first chunk (a PQ subspace) of the query, determine the cluster identifier, i.e., a PQ code word, for the first subspace of each of the selected quantized database items, and use that identifier to identify the cluster center in the PQ codebook in the subspace. The system may then perform the dot product between the chunk of the query and the PQ codebook entry for the quantized data item. The result of the dot product is a similarity score for the subspace and the similarity between the query and the database item is the sum of the dot product for all subspaces. The system may repeat this for any database items mapped to a VQ code word selected for the query. Thus, the system only performs an inner product with a portion of the full database vectors, improving query response time.

The VQ and PQ codebooks and the transformation may be jointly learned using stochastic gradient descent. At each iteration, the gradient of quantization error is computed on a mini-batch of data for a fixed assignment of data points to code words. After performing a descent step, code word assignments for the data points are recomputed. The transformation may be initialized by sampling from $\mathcal{N}(0.0.1)$ and parameterized via the Cayley characterization of orthogonal matrices.

According to one general aspect, a computer system includes at least one processor and memory storing a database of quantized items. Each of the quantized items includes a first entry into a first code book and a plurality of second entries into a second code book, where each of the plurality of second entries represents a respective subspace of k subspaces. The memory also includes instructions that, when executed by the at least one processor, cause the system to perform operations. The operations can include determining a cluster center from the first code book that is most similar to a query vector, calculating a residual vector from the cluster center and the query vector, transforming the residual vector using a learned transformation, and projecting the transformed residual vector into the k subspaces. The operations can also include, for each of the quantized items having a first index that corresponds to the cluster center determined for the query vector, calculating, for each subspace, an inner product between the quantized item and the transformed residual vector, and calculating a similarity score between the quantized item and the query by summing the inner products. The operations may also include providing items with highest similarity scores in response to the query.

According to one aspect, a method includes clustering a data store of database items represented as high-dimensionality vectors and selecting a cluster center for each cluster and storing the cluster center as an entry in a first layer codebook. The method may also include, for each of the database items, calculating a residual based on the cluster center for the cluster the database item is assigned to, projecting the residual into subspaces, determining, for each of the subspaces, an entry in a second layer codebook for the subspace, and storing the entry in the first layer codebook and the respective entry in the second layer codebook for each of the subspaces as a quantized vector for the database item.

According to one aspect, a method can include partitioning vectors in a database into m partitions using vector quantization, so that each vector has an assigned vector quantization code word and calculating, for each of the vectors, a respective residual, the residual being the difference between the vector and a cluster center corresponding to the vector quantization code word. The method may further include applying product quantization to each of the residuals, producing, for each residual, a product quantization code word for each of k subspaces, storing, for each vector, the assigned vector quantization code word and k product quantization code words for the residual of the vector, and using the vector quantization code words to select a portion of the database vectors most similar to a query vector. The method may also include, for each of the database vectors in the portion, using the product quantization code words to determine database vectors from the portion most similar to the query vector.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, implementations provide fast maximum inner product searches on large, dense, high dimensional datasets. Such datasets are often associated with recommendation or classification systems, such finding an image, video, or product similar to a query image, video, or product. Another example of such a problem is a classification model that computes the probability of nearby words given a target word using inner product. The search avoids a full scan of the dataset with minimal loss of recall while providing high performance on modern CPU architectures. Implementations include a hierarchical combination of vector quantization and product quantization that greatly reduces error in approximating inner products for large, dense, high-dimensional datasets with low latency (e.g., faster processing time). As another example, the codebooks and transformation can be jointly trained end-to-end, which results in lower approximation error in representing the dataset, improving recall. Some implementations provide an in-register lookup table to compute the inner product between subspaces of the query and the quantized database items, which exploits the instruction level parallelism capabilities of modern processors and provides significant improvement over in-memory lookups. In some implementations, the final complexity of the search is $$\mathcal{O}\left(\frac{nkt}{m}\right)$$

where k is the number of subspaces, m is the number of vector quantizers (e.g., the number of entries in the VQ code book), t is the number of VQ code words selected for the query vector, and n is the number of database items. Thus, when k much smaller than data dimensionality d, and t is much smaller than m, the complexity of the search is much faster than a brute-force search $\mathcal{O}(nd)$. In addition, the memory footprint of disclosed implementations will be $\mathcal{O}(n \log_2 m + nK \log_2 J)$, which is much smaller than the memory footprint of brute-force (i.e., $\mathcal{O}(nd)$).

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
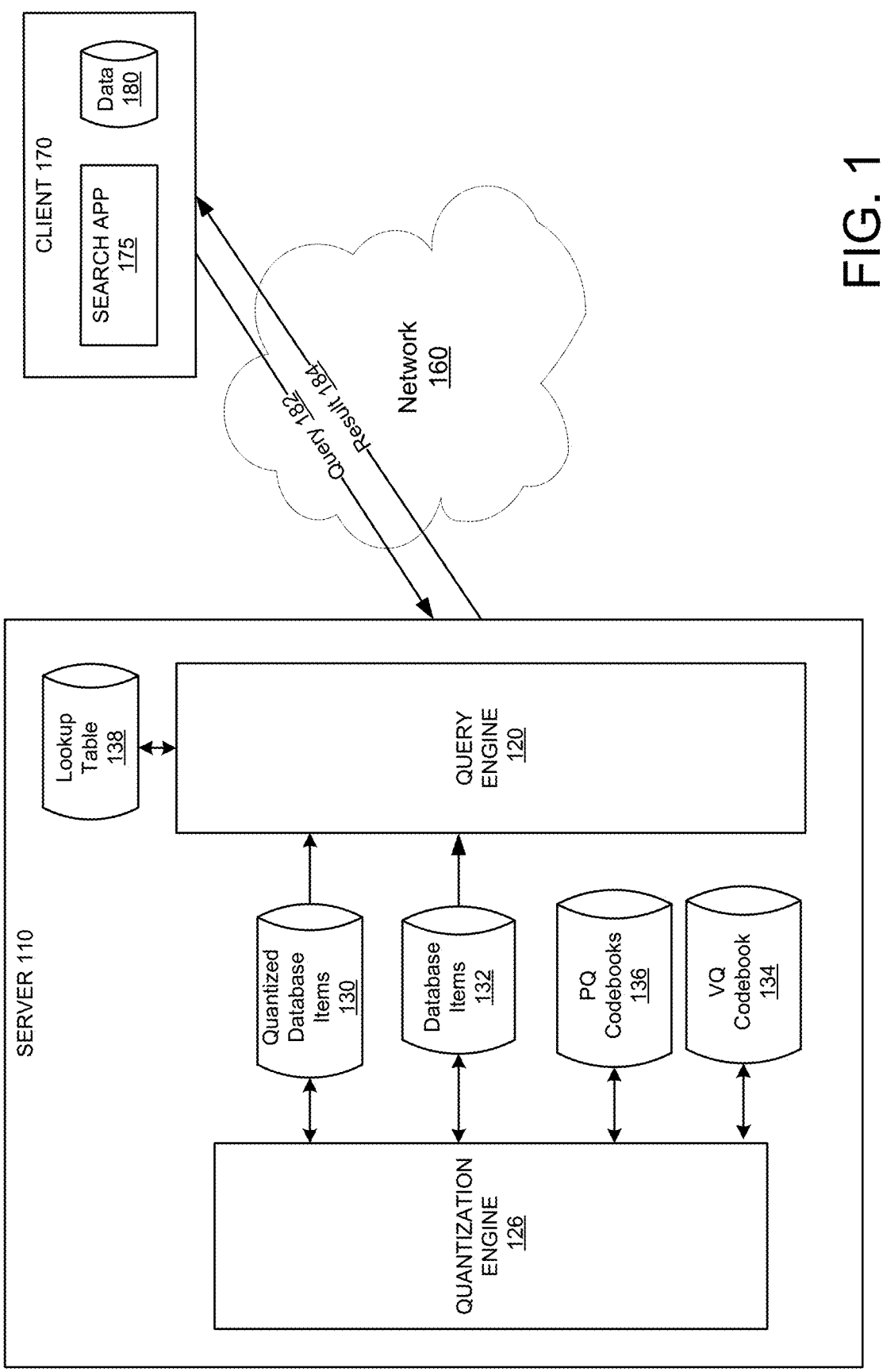
FIG. 1 illustrates an example system in accordance with the disclosed subject matter.

FIG. 1 is a block diagram of a scalable inference system in accordance with an example implementation. The system 100 may be used to hierarchically quantize a database of items and compute an inner-product with a query vector to find relevant database items for use in applications like recommendation systems, categorization in machine learning algorithms, and other systems that use a nearest neighbor computation. The system 100 jointly learns the codebooks for the hierarchical levels and reduces the processing time needed to perform the inner product search while still retaining high quality results. The depiction of system 100 in FIG. 1 is described as a server-based search system. However, other configurations and applications may be used. For example, some operations may be performed on a client device. Furthermore, while the system 100 is described as a search system, the methods and techniques of disclosed implementations can be used in any task that uses a Maximum Inner Product, such as classifications performed in the last layer of neural networks with a large number (e.g., millions) of output nodes, for example. Thus, implementations are not limited to search systems but can be used in any system addressing a MIPS problem.

Figure 7:
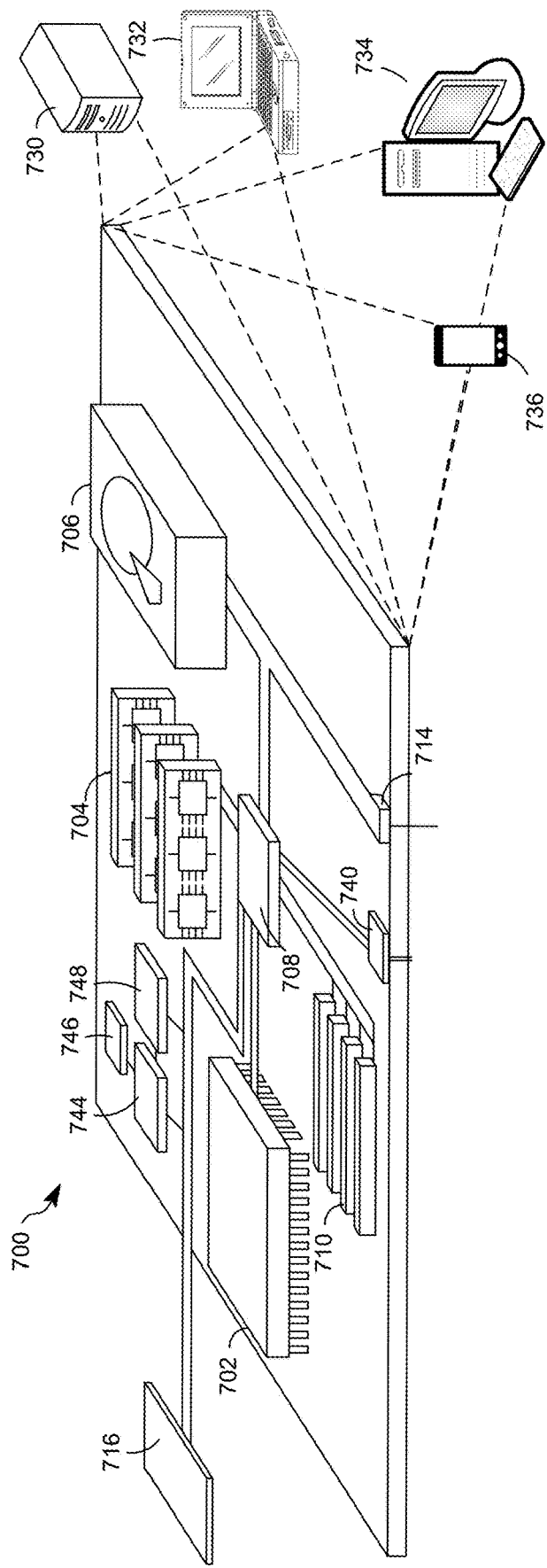
FIG. 7 shows an example of a computer device that can be used to implement the described techniques.
Figure 8:
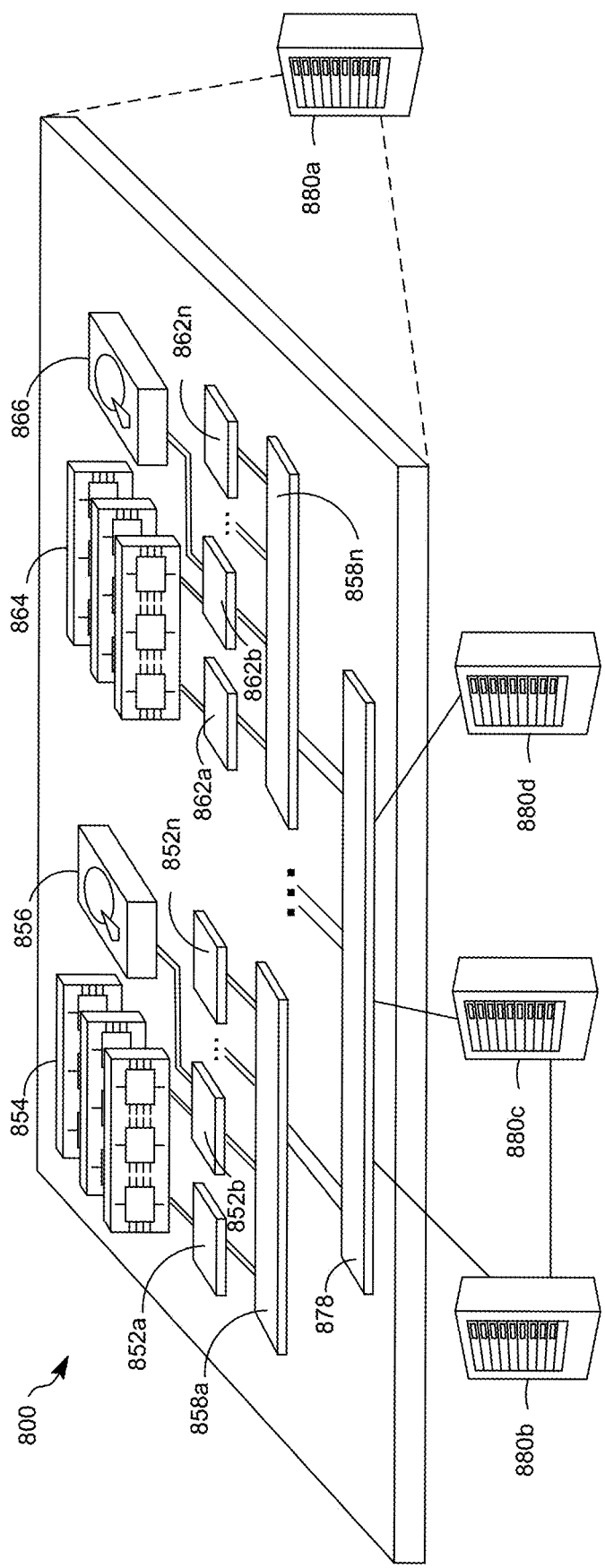
FIG. 8 shows an example of a distributed computer device that can be used to implement the described techniques.

The scalable inference system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 700, as depicted in FIG. 7 or computer device 800, as depicted in FIG. 8.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The processors may also include registers capable of performing data-level parallelism, e.g., single-instruction multiple-data (SIMD) registers. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include a quantization engine 126 and a query engine 120. The quantization engine 126 may hierarchically quantize a database of database items 132 and, in the process, generate a codebook for each level in the hierarchy, e.g., VQ codebook 134, PQ codebooks 136. The result of the hierarchical quantization is quantized database items 130. In the example of FIG. 1 the VQ codebook 134 represents a first layer in the hierarchy and the PQ codebooks 136 represent a second layer. In implementations that have more than two layers, the quantization engine 126 may generate additional codebooks, e.g., one per layer. Thus, for example if the system 100 uses two vector quantization layers followed by one product quantization layer, the system 100 may generate a second VQ codebook for the additional vector quantization layer. The resulting quantized database items 130 and the codebooks, e.g., VQ codebook 134 and PQ codebook 136, has a smaller memory footprint than the database of database items 132. The database items 132 may be a database of vectors. A vector may be thought of as an array of floating point numbers with a dimensionality of d, or in other words an array with d positions. A query, such as query 182, may also be expressed as vectors of dimension d. When d is large and the number of database entries is large (e.g., tens of thousands or even millions), computation of an inner product between a query vector and the database vectors is slow and processor-intensive. Quantization enables approximation of an inner product but introduces quantization error. The higher the error the less accurate the results.

To enable faster computation time while retaining a high level of accuracy, the quantization engine 126 may quantize the database items 132. The quantization engine 126 may first perform vector quantization on the database items 132 to assign each database item an entry in the VQ codebook 134. Thus each database item 132 has a respective VQ code word, the code word identifying an entry in the VQ codebook 134. The quantization engine 126 may then determine a residual vector for each database item, the residual vector being the difference between the database item vector and the cluster center, e.g., the vector corresponding to the entry in the VQ codebook 134 that the database item is mapped to. The quantization engine 126 may then transform the residual using a learned rotation. The learned rotation reduces the variance in each subspace of the subsequent product quantization, which yields substantially lower quantization error and higher recall. The quantization engine 126 may then further quantize the rotated residual vector via product quantization, or in other words project the transformed residual into subspaces and map each subspace to an entry in the PQ codebook generated for the subspace. Thus, each subspace of the transformed residual has a respective PQ code word, the PQ code word for a subspace identifying an entry in the PQ codebook for that subspace. The system may store the VQ code word and the respective PQ code word for each subspace as a quantized database item in quantized database items 130.

Figure 2:
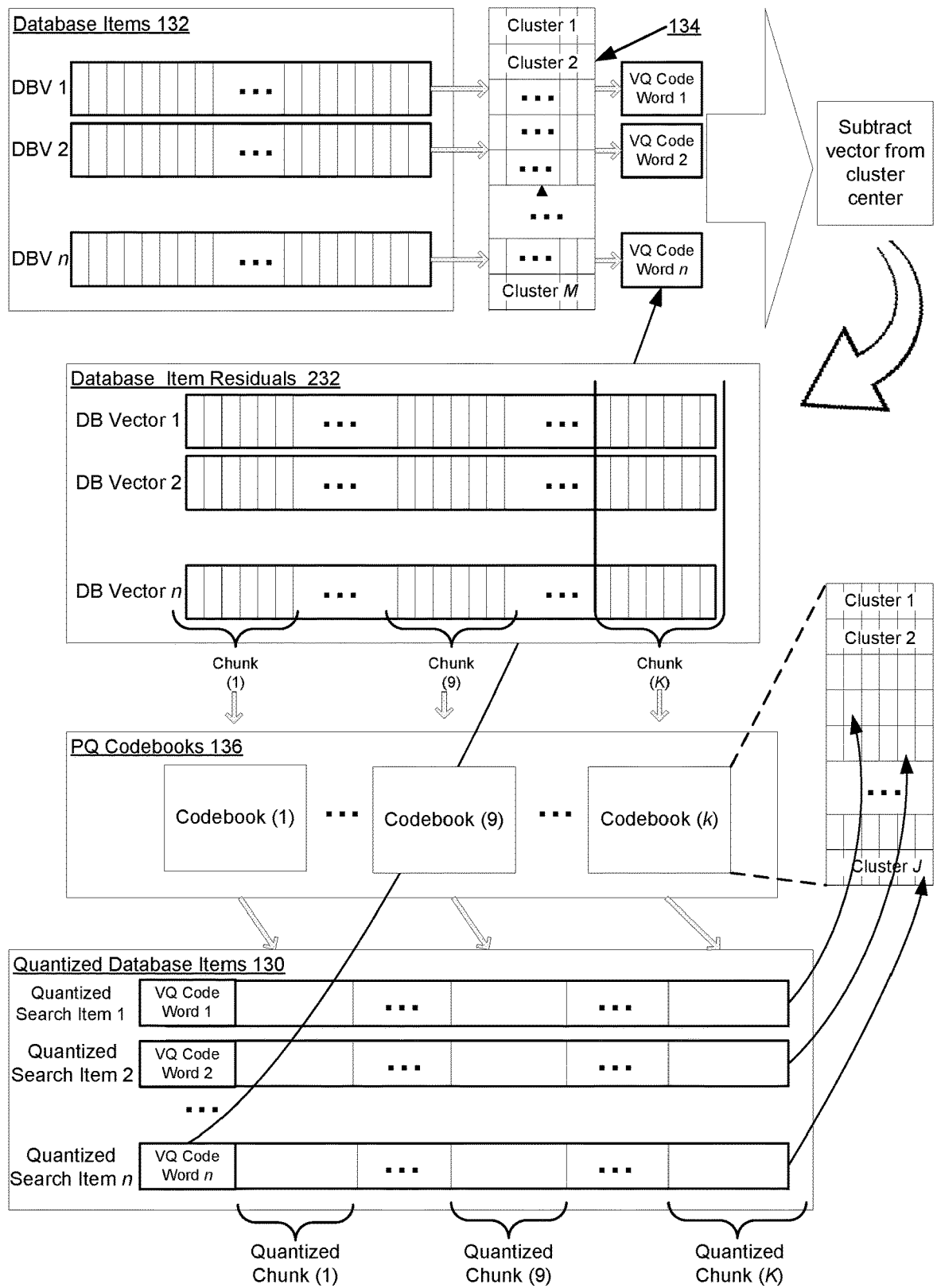
FIG. 2 illustrates a block diagram of hierarchical quantization of database vectors representing search items, in accordance with disclosed subject matter.

FIG. 2 illustrates example database items 132 and quantized database items 130. In the example of FIG. 2, the database items 132 include n entries, or n distinct database items. Each database item in database items 132 (e.g., database vector (DBV) 1, DBV 2, etc.) has d dimensions, or in other words d elements. The quantization engine 126 may first quantize the database items 132 via vector quantization using VQ codebook 134. In vector quantization each database vector is assigned a VQ code word from the VQ codebook 134. A VQ code word represents a specific entry in the VQ codebook 134, and each entry in the VQ codebook 134 is a cluster center, or in other words a data point that best represents the cluster. Thus, in effect, the vector quantization associates each database item with a cluster. The VQ codebook 134 is learned and generated by the quantization engine 126 and the assignments of the database items may occur concurrently with the generation of the VQ codebook 134. The VQ codebook 134 may have M entries, which may be determined when the VQ codebook 134 is learned or may be provided as a parameter. Thus the database items 132 may be partitioned into M partitions. The quantization engine 126 stores the VQ code word for each database item as the first portion of a quantized database item in quantized database items 130. This represents the first layer in the hierarchical quantization.

The quantization engine may use the VQ code word and the VQ codebook 134 to generate a residual for each database item. A residual is the difference between the database vector and the cluster center associated with the database vector. The difference may be calculated by subtracting the database vector from the cluster center vector (or vice versa). Thus the quantization engine 126 may use vector quantization to obtain a residual dataset, e.g., database item residuals 232, that has a much smaller diameter than the original vectors, e.g., database items 132. In other words, the database item residual 232 still have d dimensions, but the variance within the values of the floating point numbers in the vector is reduced. The quantization engine 126 may only store these residuals 232 temporarily because they are further quantized in another layer of the hierarchy. The smaller diameter yields significant reductions in quantization error when further quantized using product quantization (the second layer).

In some implementations, the quantization engine 126 may rotate the database item residuals 232 using a learned rotation. The learned rotation may be used to achieve an optimal distribution of information to the various subspaces generated by product quantization. The learned rotation may be optimized to reduce error using stochastic gradient descent. The rotation may be learned jointly with the VQ codebook 134 and the PQ codebooks 136 to minimize the quantization error. The learned rotation thus provides smaller quantization error over random rotation. However, in some implementations, no rotation or random rotation may be performed. If a database item residual vector 232 is subjected to learned rotation, it is referred to as transformed, or a transformed residual. In some implementations, the transformed residual may undergo another round of vector quantization, adding layers to the hierarchy. After each vector quantization, the system may again compute a residual, which may undergo the product quantization.

The quantization engine 126 then projects the database item residuals 232, which may be transformed, into K subspaces. A subspace is a block of elements from each residual database item vector occurring at the same vector position. In some implementations, d is divisible by K so that each block includes the same number of elements. Such an implementation is shown in FIG. 2, where each subspace is a block of six elements. In some implementations, even where d is divisible by K, direct division may result in subspaces where the number of elements in each subspace is not equal. In some implementations, division may be based on random or learned projection of the vectors. In some implementations, variably sized subspaces may be generated by assigning the first mod (d, K) subspaces an extra dimension each. In such implementations, the number of elements in each block may not be equal. In the example illustrated in FIG. 2, the projection or division results in K subspaces or chunks, each subspace having n rows of six elements.

Once the transformed residual vectors are projected into subspaces, the quantization engine 126 may generate PQ codebooks 136. The PQ codebooks 136 may include one codebook for each subspace. Thus, using the example of FIG. 2, the PQ codebooks 136 include K PQ codebooks. In some implementations, the PQ codebook for each subspace may be referred to collectively as a PQ codebook for the database items 132. Each PQ codebook may include an entry for each of J clusters. The quantity of clusters, J, may be determined as the PQ codebooks 136 are generated or the quantity J may be passed in as a parameter to the quantization engine 126. For example, the parameter may indicate that the quantization engine 126 should generate 16 clusters for each codebook or 256 clusters for each codebook. In some implementations, the number of clusters (i.e., the value of J) may depend on the size of a register, e.g., a SIMD register. In other words, to improve computing time, the number of clusters may be limited to the number of parallel lookups a register in the system can perform. When clusters are generated, each cluster will have a cluster center. The cluster center is the entry for that cluster in the codebook. For example, in FIG. 2, subspace K (i.e., Chunk (K)) has six elements from each of n vectors (the transformed residuals). The quantization engine 126 may cluster the n vectors of six elements each into one of J clusters. Of course the cluster center need not match a database vector subspace, but may represent six elements that serve as the cluster center. For the ease of discussion the codebook for the $k^{th}$ subspace may be represented by $S^{(k)}$. Because each codebook has J entries, the $j^{th}$ entry in the codebook may be represented by $S_j^{(k)}$.

In some implementations, the system may learn the cluster centers for the VQ codebook and the PQ codebooks with the rotation, jointly. The quantization engine 126 may use conventional clustering algorithms based on a Euclidean distance or k-means and use a stochastic gradient descent where, at each iteration the gradient of quantization error is computed on a mini-batch of data for a fixed assignment of data points to code words. After performing a descent step, code word assignments for the database items are recomputed. In this manner the assignment of code words to database items can take place concurrently with learning of the codebooks. To optimize the orthogonal transformation of the residuals while maintaining orthogonality, the quantization engine 126 may parameterize the transformation via the Cayley characterization of orthogonal matrices, which is represented by $R=(1-A)(I+A)^{-1}$ where A is a skew-symmetric matrix, i.e., $A=-A^T$ and I is an identity matrix of size d×d. The parameters of the skew-symmetric matrix A are d(d−1)/2 so computing the transformation matrix R can involve d×d matrix inversion at each iteration. If d is high-dimensional (e.g., more than thousands) the system may restrict the number of parameters of A. This trades off capacity and computational cost.

In some implementations, the quantization engine 126 may initialize the VQ codebook 134 using random samples from the database of database items 132 and may initialize the PQ codebooks using the residuals (e.g., after vector quantization) of a set of independent samples. To allow the vector quantization layer a chance to partition the space, the quantization engine 126 may optimize only the vector quantization error for several epochs before initializing the PQ codebooks 136 and doing full joint training. The quantization engine 126 may initialize the parameters of the skew-symmetric matrix A by sampling from N (0.0.1).

In some implementations, the system may assign database vectors to an entry in the codebook via a M-dimensional (for the VQ codebook) or J-dimensional (for the PQ codebooks) one-hot assignment vector. A one-hot assignment vector for the vector x (e.g., $\alpha_x$) or for the $k^{th}$ subspace of vector x (e.g., $\alpha_x^{(k)}$) may be all zeros except for the position that represents the cluster assignment. In some implementations, the assignment vectors for x (e.g., $\alpha_x$) may be the quantized database item. In other words, in some implementations, the assignment vector may be the code word. The dot product of the assignment vector and the codebook may thus provide the cluster center (e.g., the quantization) of the vector x (or of the $k^{th}$ subspace of vector x). In some implementations, the information in the quantized database item may be a pointer to the codebook entry. The quantization engine 126 may generate the quantized database item by concatenating the code words from the different levels. In the example of FIG. 2, the VQ code word is first, followed by the PQ code word for each of the K subspaces. If the system 100 uses additional layers, the code word (or words) from each additional layer may be concatenated in the order of quantization. For example, if the system performs another layer of vector quantization before the product quantization, the code word for the second layer of vector quantization would follow the code word for the first vector quantitation layer ahead of the code words for the product quantization. The quantization engine 126 may store the quantized database items 130, the VQ codebook 134, the PQ codebooks 136 and the learned transformation matrix R for use by the query engine 120.

Once the quantization engine 126 has generated the codebooks, learned the rotation, and generated quantized vectors, e.g., quantized database items 130, the system 100 is ready to use the VQ codebook 134, the PQ codebook 136, the learned transformation matrix R and quantized database items 130 to respond to queries. The modules may thus include query engine 120. The query engine 120 may be configured to use the codebooks and quantized database items 130 to identify database items 132 that are responsive to a query 182 and to provide a result 184 in response to the query 182. The query engine 120 may include modules or engines that create a query vector from the query 182 using conventional techniques. The query engine 120 may determine which of the clusters from the VQ code book 134 that the query is closest to. In some implementations, this may include calculating an inner product between the query vector and each cluster center and selecting the cluster center with the maximum inner product. In some implementations, the query engine 120 may select more than one cluster center as "closest," e.g., selecting the top t clusters with the highest inner product. Thus, the query engine 120 may determine a VQ code word (or words) for the query 182. The query engine 120 may use the VQ code word (or words) to reduce the computational time of the inner product search by limiting the comparison of the query vector to only those quantized database items that share the VQ code word. Thus, rather than comparing the query vector to each database item, only those database items that share the VQ code word are considered. Of course, if the query engine 120 selects multiple VQ code words, the quantized database items that correspond to the additional VQ code words would also be included in the comparison with the query 182.

The system then calculates the residual for the query 182, e.g., by subtracting the query vector from the cluster center that corresponds with the VQ code word. If the system 100 has transformed the quantized database items, the query engine 120 may also transform the residual query vector. The system may project the residual query vector into subspaces. The subspaces that the query residual is projected into match the subspaces that the database items 132 are projected onto. Thus, the residual query vector may have K subspaces.

In some implementations, the query engine 120 may generate lookup table 138. Lookup table 138 may store the result of the inner product of each cluster center in each subspace with the corresponding subspace of the query vector. Thus, the system may pre-compute the inner product between each data point in each PQ codebook and the corresponding residual query vector subspace and store the result in the lookup table 138. This may result in a table or database where the result of the inner product can be accessed by knowing the PQ code word for any particular subspace (e.g., which cluster in which subspace). In some implementations, the lookup table 138 may be stored in-register, e.g., in SIMD registers. In some implementations, each subspace may have a lookup table 138 stored in a register, giving K lookup tables. The query engine 120 may use the lookup tables 138 to substantially speed up the search, even over in-memory tables. However, use of in-register tables may mean that J is selected based on the capacity of the register, e.g., 16 or 32.

The query engine 120 may then determine the inner product of each quantized database item associated with a selected VQ code word and the query. To accomplish this, the query engine 120 may, for each examined quantized database vector, determine the PQ codebook assignment, i.e., the PQ code word, in each subspace and determine the inner product of the data point represented by the PQ codebook assignment in that subspace and the corresponding subspace of the residual query vector. In implementations that use the lookup table 138, the system may do a lookup in the table for the PQ codebook entry and subspace. Thus—rather than perform the inner product operation between the query and the PQ codebook entry for a database item, the query engine 120 can use a lookup into the lookup table 138. As indicated above, in some implementations the lookup tables 138 may be stored in-register and the system may store the corresponding PQ code words for a database item in-register. In this manner the system may perform 16 parallel (or 32 parallel) lookups in one CPU cycle. In other implementations, the system may perform the inner product. The query engine 120 may approximate the inner product between the database item and the query as the sum of the results of the inner product in each subspace between the PQ portion (second portion, or second layer portions) of the quantized database item and the query. In other words, using the example of FIG. 2, the approximated inner product between a query and DBV 1 is the sum of the inner product between quantized chunk (1) through quantized chunk (K) of the quantized search item 1 and the residual query vector. This may be represented by $$\sum_{k=1}^{K} S^{(k)}_{index(\phi^{(k)}_{PQ(r_x)})}$$

where $S^{(k)}$ is the lookup table for the $k^{th}$ subspace, and $\phi^{(k)}_{PQ(r_x)}$ is the PQ code word for the $k^{th}$ subspace of database item x.

Once the query engine 120 has determined database items with the highest inner product using the approximation above, the search has determined the database items responsive to the query. In some implementations, the query engine 120 may include a ranking engine that orders the results 184 by the similarity score, i.e., the highest inner products. The query engine 120 may provide the results 184 for display at a client device, such as client 170. Of course the responsive database item may be used for other purposes, such as classification.

Scalable inference system 100 may be in communication with client(s) 170 over network 160. Clients 170 may allow a user to provide query 182 to the query engine 120 and to receive result 184, which includes database items found responsive to the query based on the approximate inner product with the search query using the quantized database items. Network 160 may be for example, the Internet or the network 160 can be a wired or wireless local area network (LAN), wide area network (WAN), etc., implemented using, for example, gateway devices, bridges, switches, and/or so forth. Via the network 160, the scalable inference system 100 may communicate with and transmit data to/from clients 170. In some implementations, the client 170 may include applications, such as search app 175 that performs some or all of the functions of the query engine 120. For example, the quantized database items 130 do not take up much memory compared to database items 132 and may be of a size suitable for storage on the client, such as in data store 180. Data store 180 may include any type of non-volatile memory, such as flash, SD, RAM, disk, etc. The server 110 may transmit the quantized database items 130, the VQ code book 134, and the PQ codebooks 136 to the client 170 and the search application 175 may perform the actions described above with regard to query engine 120. In some implementations, the client 170 may be another server or system. Client 170 may be another example of computing device 800 or computing device 700.

In some implementations, scalable inference system 100 may be in communication with or include other computing devices that provide updates to the database items 132. Scalable inference system 100 represents one example configuration and other configurations are possible. In addition, components of system 100 may be combined or distributed in a manner differently than illustrated. For example, in some implementations one or more of the query engine 120 and the quantization engine 126 may be combined into a single module or engine. In addition, components or features of the query engine 120, the quantization engine 126 may be distributed between two or more modules or engines, or even distributed across multiple computing devices. For example, database items 132 and/or quantized database items 130 may be distributed across multiple computing devices.

Figure 3:
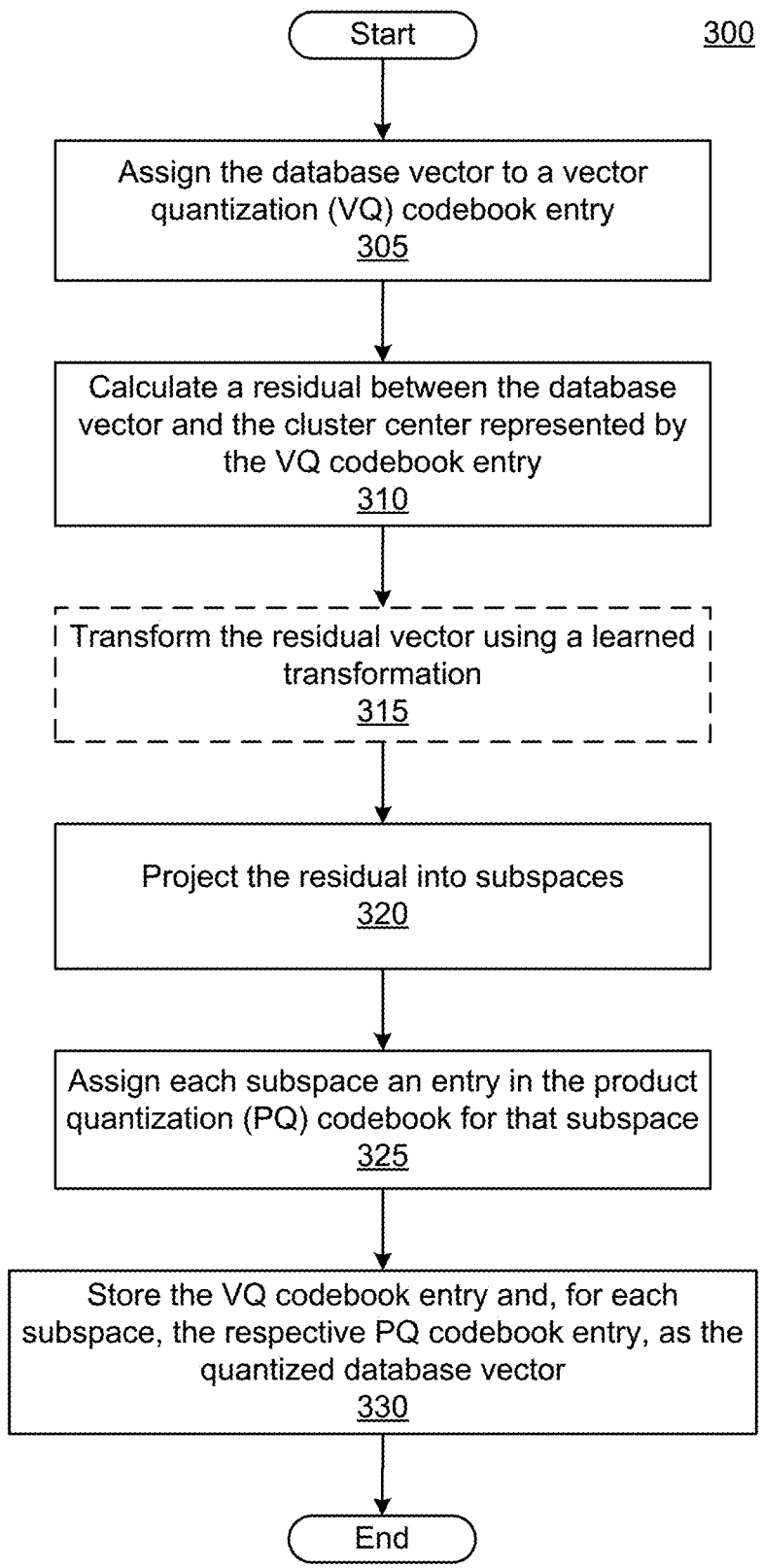
FIG. 3 illustrates a flow diagram of an example process for performing hierarchical quantization on a database item, according to an implementation.

FIG. 3 illustrates a flow diagram of an example process 300 for using hierarchical quantization to prepare a database of items for a fast maximum inner product search (MIPS), according to an implementation. Process 300 may be performed by a scalable inference system, such as system 100 of FIG. 1. Process 300 is an example of hierarchical quantization of a single database item, performed by quantization engine 126 of FIG. 1. It is understood that the system may also perform process 300 concurrently on all database vectors and that process 300 may be performed concurrently with the generating or learning of the codebooks for quantization, as described in more detail with regard to FIG. 5. Process 300 may be performed periodically by the system so that the quantized database items and codebooks generated stay current. For example, the system may perform process 300 once a day, once a week, once an hour, etc. depending on how often the database of items is updated with new items.

Process 300 may begin with the scalable inference system assigning each database item, i.e., each database vector an entry in a vector quantization (VQ) codebook (305). In other words, the system may assign each database item a VQ code word. The VQ code word points to an entry in the VQ codebook, which contains (or points to) a cluster center. Thus, the VQ code word can also be referred to as a cluster identifier. The cluster center is a vector of the same dimensionality as the database item vectors and is most representative of the database items in the cluster. The VQ codebook may be generated via a learning process, which may also perform the mapping of database items to VQ codebook entries. The assignment of respective VQ code words to the database items is a first level in the hierarchical quantization, and the VQ code word for each database item is a first level portion of the quantized database item. Formally, the vector quantization may be represented as $\phi_{VQ}(x)=\mathrm{argmin}_{u \in U_i}\|x-u\|^2$, which returns the vector quantization code word for x, $U \in \mathbb{R}^{d \times m}$ is the vector quantization codebook (e.g., codebook 134) with m entries, and $U_i$ is the $i^{th}$ entry.

The system may calculate a residual vector for each of the database items (310). The residual vector is the difference between the database item vector and the cluster center corresponding to the database item's VQ code word. Real world data is often clusterable, with the diameter of clusters substantially lower than the diameter of the dataset as a whole. Thus the system may use vector quantization to obtain the residual dataset, which has a much smaller diameter, yielding significant reductions in quantization error when quantized with product quantization. Hierarchical quantization thus takes advantage of vector quantization, which is well-suited to approximating the low dimensional component, and product quantization, which is well-suited to capture high dimensional data from the residuals.

In some implementations, the system may perform a learned rotation or transformation on the residual vector (315). In some implementations, the rotation is learned jointly with the codebooks. The learned rotation provides better recall, as demonstrated by FIG. 6C. The learned rotation may be a matrix $R \in \mathbb{R}^{d \times d}$ applied to the residuals of the vector quantization. In some implementations, the transformation may be a random, but fixed, permutation. In other words, the permutation is randomly generated but once the permutation is generated it is fixed and can be applied to all database vectors and all query vectors. However, random transformation does not produce the same recall as a learned rotation. In some implementations, step 315 is optional and the residual vectors are left unchanged.

The system may project each of the residual vectors into subspaces (320). In some implementations, each subspace may have an equal number of elements from the vector. In some implementations, the subspaces may not have equal numbers of elements. The subspaces may also be referred to as chunks. The system may assign each subspace an entry in a product quantization (PQ) codebook for the subspace (325). In some implementations, the assignment may occur as part of the generation of the PQ codebooks through a clustering process. A PQ codebook for a particular subspace thus includes an entry for each cluster, with the cluster center as the entry. The cluster center has the same number of elements as the portion of the residual vectors in the subspace.

In other words, each subspace has a PQ codebook, and each codebook has J entries. The value of J may depend on parameters provided to the procedure that generates the PQ codebooks or the procedure may determine the value based on the data. In some implementations, the value of J may depend on the capacity of a register, e.g., a SIMD register or other register. For example, the value of J may be 16 so that a single register can hold the entire PQ codebook for the subspace k (e.g., $S^{(k)}$. Each database vector subspace may be mapped or assigned to one of the J entries in the codebook for the subspace. A specific entry j in the PQ codebook for subspace k be represented as $S_j^{(k)}$. In some implementations, the assignment may occur as part of generating the codebook. For example, when clustering is used, each residual vector subspace may be assigned to one of the clusters, as the clusters are generated from the residual vectors for a subspace.

The system may generate a quantized vector for each database vector by concatenating the VQ code word with each the PQ code word for each subspace (330). The VQ code word may be a code word for the first level of the hierarchy, and the PQ code words (one for each subspace) may be for a second level of the hierarchy. Thus, in hierarchical quantization a database vector x may be approximated by $$x \approx \hat{x} = \phi_{VQ}(x) + R^T \phi_{PQ}(r_x), r_x = R(x - \phi_{VQ}(x)),$$

where $\phi_{VQ}(x)=\mathrm{argmin}_{u \in U_i}\|x-u\|^2$ returns the VQ code word for x, $U \in \mathbb{R}^{d \times m}$ is a vector quantization codebook with m codewords, the matrix $R \in \mathbb{R}^{d \times d}$ is a learned rotation applied to the residuals of vector quantization, and the product quantizer is given by $$\phi_{PQ}(r_x) = \begin{pmatrix} \phi_{PQ}^{(1)}(r_x^{(1)}) \\ \phi_{PQ}^{(2)}(r_x^{(2)}) \\ \vdots \\ \phi_{PQ}^{(K)}(r_x^{(K)}) \end{pmatrix}, r_x = \begin{pmatrix} r_x^{(1)} \\ r_x^{(2)} \\ \vdots \\ r_x^{(K)} \end{pmatrix},$$

the concatenation of code words obtained by dividing the rotated residuals $r_x$ into K subspaces 1 to K, and quantizing the subspaces independently by vector quantizers $\phi_{PQ}^{(k)}(\bullet)$ to minimize quantization error: $\phi_{PQ}^{(k)}(r_x^{(k)}) = \mathrm{argmin}_{s \in \{s_j^{(k)}\}} \|s - r_x^{(k)}\|^2$ where $S^{(k)} \in \mathbb{R}^{d_{xj}^{(k)}}$ is the PQ codebook for the $k^{th}$ subspace (with j entries). The final quantized representation of x is given by concatenating the index of $\phi_{VQ}(x)$ and the K indices of $\phi_{PQ}^{(k)}(r_x^{(k)})$, k=1, ..., K. This representation, i.e., the quantized database item, has an overall bitrate of $\log_2 m + K \log_2 j$, where m is the number of entries in the VQ codebook, j is the number of entries in each PQ codebook, and K is the number of subspaces. The system may store each quantized database item, along with the VQ codebook, the PQ codebooks, and the learned rotation R in a data store, database, or other memory. Process 300 then ends, having generated structures that can be used to approximate the maximum inner product between query items and the database items in a highly efficient manner and accurate manner.

While FIG. 3 illustrates a hierarchy with two layers, the system may include more than two layers in the hierarchy. For example, the system may perform one or more additional vector quantization layers or one or more additional product quantization layers, as needed and/or supported by the data. Each additional layer would add an additional code word to the quantized database item. In addition, each layer receives the residual calculated in the previous layer.

Figure 4:
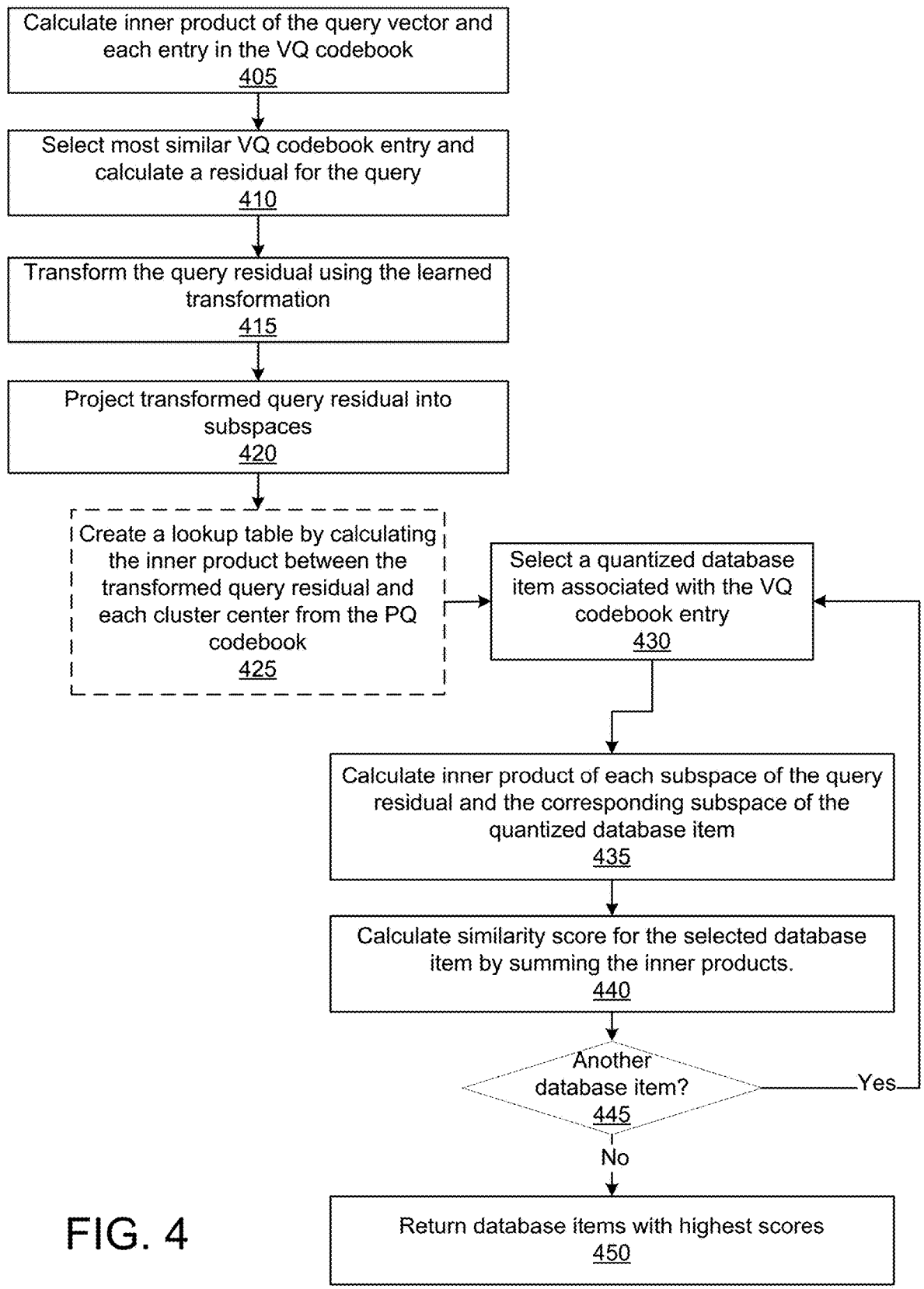
FIG. 4 illustrates a flow diagram of an example query process using hierarchical quantization and maximum inner-product search, according to an implementation.

FIG. 4 illustrates a flow diagram of an example process 400 for identifying responsive database items using hierarchical quantization, in accordance with disclosed subject matter. Process 400 may be performed by a scalable inference system, such as system 100 of FIG. 1. Process 400 may be performed each time a query is received in order to determine the database items that have a maximum inner product with the query vector. Those items with the highest inner product are most responsive to the query, or in other words most like the query. The query vector may also represent an item to be categorized, e.g., as part of a last layer of a neural network with a large number of output nodes.

Process 400 may begin with the system determining the inner product of the query vector and each entry in the VQ code book (405). This provides a VQ code word is that is most similar to the query. The system may select the VQ code book entry that is most similar (based on the result of the inner product calculation) and calculate a residual for the query (410), e.g., as the difference between the query vector and the selected VQ code book entry. In some implementations, the system may select more than one "most similar" VQ code book entry, e.g., selecting t most similar entries (e.g., t=2 or t=5, etc., and t<m). In such implementations, the system may generate a residual for each selected VQ code book entry, so that each selected vector quantization entry has a respective residual query vector.

The system may transform the residual query vector(s) (415). In implementations that use a transformation, the transformation or rotation is the same one used in step 315 of FIG. 3. The scalable inference system may also project the residual query vector (or vectors) into subspaces (420). The projection of the query vector is done in the same manner as projection of the database item vectors as part of step 320 in FIG. 3. The system may then optionally generate a lookup table (425). The lookup table may include one entry for each entry of each PQ codebook. To generate the table the system may perform, for each subspace (i.e., each PQ codebook), an inner product between the elements of the residual query vector in the subspace and the elements of each PQ codebook entry in the subspace. Thus, if a codebook has J entries, the lookup table will have J entries for that subspace. The system may use the lookup table to speed calculation of the inner products with quantized database items as part of step 435 below, but use of a lookup table is optional. In some implementations the lookup table is stored in registers and value of J is constrained by characteristics of the registers, e.g., is 16 or 32.

The system may then compute similarity score for each quantized database item that shares the VQ code word (the VQ codebook entry) selected in step 410. Accordingly, the system may select a quantized database item that shares the VQ code word (430) and calculate, for each subspace, the inner product between the residual query elements in that subspace and the quantized database item elements for the subspace (435), which is represented by a PQ codebook entry assignment in the subspace, e.g. Quantized chunk 1 or Quantized Chunk (K) of FIG. 2. In some implementations, the system may determine the PQ codebook entry from the subspace of the quantized database item, determine the data point (e.g., cluster center) for the PQ codebook entry, and compute the inner product between the residual query subspace and the data point. In implementations that use the lookup table, the system may determine the PQ codebook entry for the quantized database item subspace and lookup the inner product result for that PQ codebook entry in the lookup table. The system may calculate a similarity score for the database item (440) by summing the inner product of each subspace, as calculated in step 435. The similarity score is an approximate inner product between the quantized database item and the query. If the query and database item vectors are projected into K subspaces, the system may sum K values, each representing an inner product calculation for a subspace. The system may repeat steps 430 to 440 (445, Yes) until a similarity score has been computed for each database item (445, No) mapped to the same VQ code word as the residual query vector.

In implementations that use codebook lookup tables, steps 430 to 440 may also be expressed as $$\bar{q}^T \phi_{PQ}(r_x) = \sum_{k=1}^{K} v_{\mathrm{index}(\phi_{PQ}^{(k)}(r_x))}^{(k)},$$

where k is the $k^{th}$ subspace of K subspaces, j is the $j^{th}$ entry of J entries in a PQ codebook, $\bar{q} = R_q$ is the rotated residual query vector, with $\bar{q}^{(k)}$ as the $k^{th}$ subvector and $v_j^{(k)}$ is the lookup table entry that is the inner product between the residual query vector and the PQ codebook entry (e.g., $v_j^{(k)} = (\bar{q}^{(k)})^T S_j^{(k)}$ where $S_j^{(k)}$ is the $j^{th}$ entry of the PQ codebook for the $k^{th}$ subspace). When the codebook lookup table is stored in-register, the system can exploit the instruction level parallelism capabilities of the central processors (CPUs). For example, the system may use one register (e.g., a SIMD register) to hold a lookup table $v^{(k)}$ and another to register to hold the indices of PQ code words for a given quantized database item. In such implementations, in one CPU cycle the system may use register instructions to perform several parallel lookups, e.g., 16 parallel lookups (PSHUFB, SSSE3) or 32 parallel lookups (VPSHUFB, AVX2). This represents a significant improvement over in-memory codebook lookup tables, which only have a throughput of one lookup per CPU cycle.

If the system selected multiple VQ code words as "most similar" to the query vector, the system may repeat steps 425 to 445 for the other VQ code words. The system may then return the database items, e.g., identifiers that identify the database items or the database vectors themselves, that have the highest similarity scores (450). As illustrated in FIG. 4, the VQ code word is used to decrease the quantity of database items for which the query vector is compared, e.g., via the inner product operation. This decreases the processing time improving the responsiveness of the system while the product quantization of the residual provides a high degree of accuracy. The complexity of a search performed by the system may be expressed as $$O\left(\frac{nkt}{m}\right)$$

where k is the number of subspaces, m is the number of vector quantizers (e.g., the number of entries in the VQ code book), t is the number of VQ code words selected for the query vector, and n is the number of database items.

In some implementations, the system may rescore the top scoring database items using an exact dot product computation. In other words, the system may compute an exact dot product for the items that have highest similarity scores and use the exact dot products to determine the database items that will be presented to the query requestor. For example, the system may use N items as the search result for the query requestor and compute the exact dot product between the query vector and the database vectors for the top 10*N database items, e.g., those 10*N with the highest similarity scores as determined using the quantized vectors. The system may then use the top N database items with the highest actual dot product. This increases the accuracy of the search result, but requires much less time to determine than computing dot products for all database items. The system may provide a search result that includes information about those items for display to the user who provided the query. Process 400 then ends, having identified the most responsive items.

Figure 5:
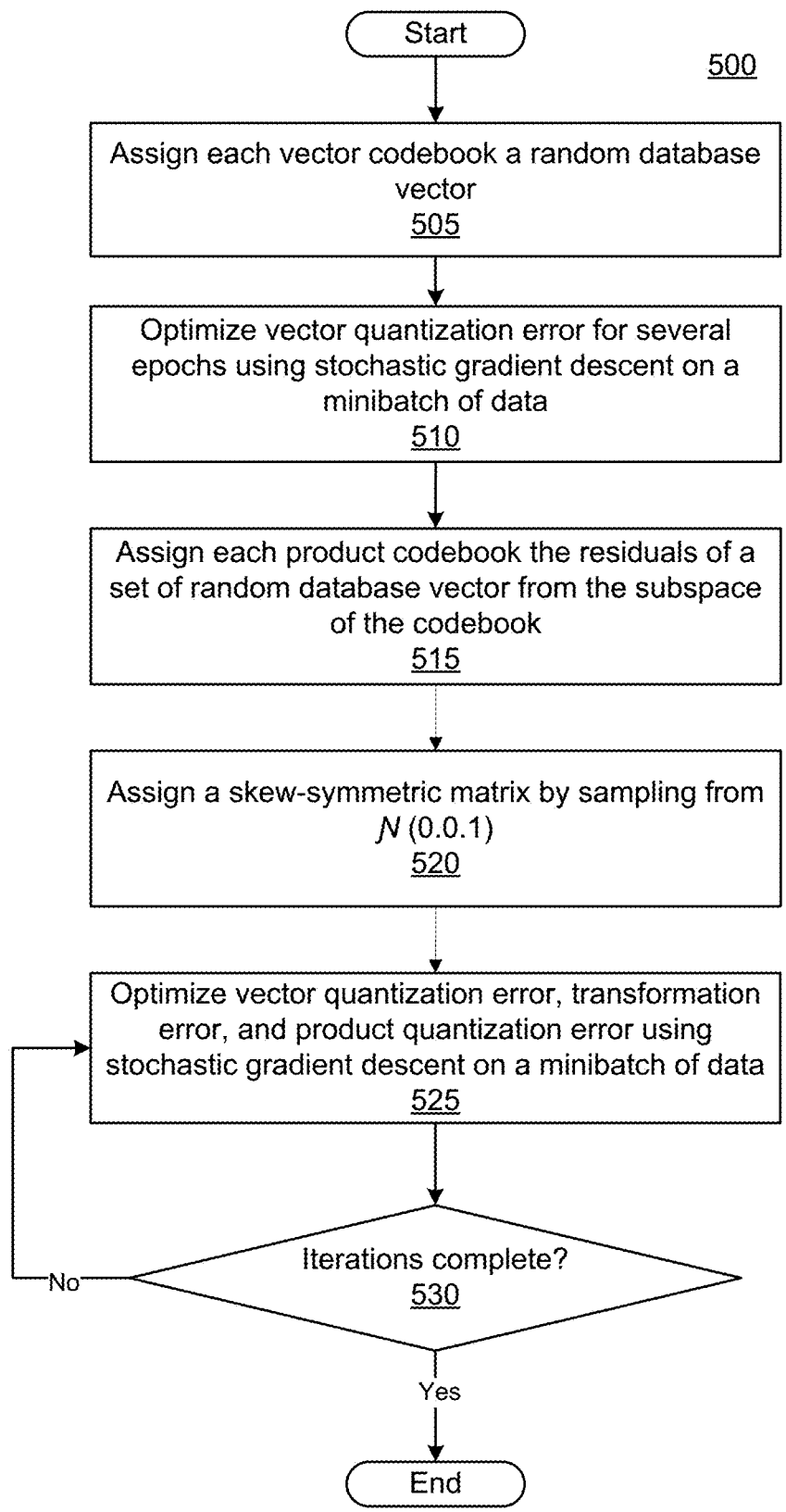
FIG. 5 illustrates a flow diagram of an example process for jointly learning an orthogonal transformation and codebooks for the hierarchical quantization, in accordance with disclosed subject matter.

FIG. 5 illustrates a flow diagram of an example process 500 for jointly learning an orthogonal transformation and codebooks for hierarchical quantization, in accordance with disclosed subject matter. Process 500 may be performed by a scalable inference system, such as system 100 of FIG. 1. Process 500 trains and optimizes task-dependent objective functions to predict clusters in each hierarchical layer and an optional learned rotation starting from random samples from the database. To jointly train the parameters (the codebooks and orthogonal transformation), the system uses stochastic gradient descent where, at each iteration, the gradient of quantization error is computed on a mini-batch of data for a fixed assignment of data points (database items) to code words. After performing a descent step, code word assignments for the data points are recomputed. In other words, process 500 uses an iterative process to alternate between solving the codebooks for each layer and the assignments of the database items to a codebook entry. Process 500 may be performed as part of or concurrently with process 300 of FIG. 3.

Process 500 may begin with the scalable inference system assigning each VQ codebook entry a random database vector (505). The system may optimize the vector quantization error for several epochs using stochastic gradient descent on a mini-batch of data (510). This allows the vector quantization a chance to partition the space prior to initializing the PQ codebook entries and doing full joint training. The system may initialize the PQ codebook entries by, generating a residual for a set of independent samples from vector quantization, projecting the residuals into subspaces and assigning entries in the PQ codebooks values from the respective subspaces of the residuals (515). The system may also initialize the rotation matrix by populating a skew-symmetric matrix using a sampling from N (0.0.1).

The system may then optimize the vector quantization error, transformation error, and product quantization error using stochastic gradient descent on a mini-batch (e.g., 2000 items) of data (525). This may include finding a set of violated constraints, (but not necessarily all violated constraints), adjusting the codebook assignments for detected violations using gradient descent so that the violations no longer appear as having an approximation that is larger than the database item with the largest dot product. A violated constraint occurs when the approximate dot product generated using the hierarchical layer (i.e., using the codebooks and transformation) indicates a value between a first quantized database item and the query is greater than that of a value between a second quantized database item and the query, but the second database item (i.e., the original database item vector) actually has a highest dot product with the query. In other words, the approximation indicates the first database item has a higher similarity than the second database item, but the actual inner product of the query and the second item is the most similar (has the maximum inner product). As one example, the system may use the Adam optimization algorithm, described in Kingma et al, "Adam: A method for stochastic optimization," CoRR, abs/1412.6980, 2014, to optimize the parameters.

The system may determine whether additional iterations of the above steps are needed (530). If no violations were found in step 525, the iterations may be complete. If the iterations reach a set number (e.g., 30), the iterations may be complete. If the iterations are not complete (530, No), the system may continue adjusting the parameters by looking for violations, adjusting the assignments, and adjusting the codebook. If the iterations are complete (530, Yes), process 500 ends, having generated the VQ codebook, the PQ codebooks, and the learned transformation. When the system includes additional layers in the hierarchy, the additional codebooks are learned jointly in a similar manner.

FIGS. 6A to 6D illustrate the benefits of implementations that use hierarchical quantization. In the examples of FIGS. 6A to 6D, evaluations of hierarchical quantization and other quantization processes are compared across four benchmark databases. Table 1 illustrates the characteristics of the four databases:

TABLE 1

| Dataset | Dimension (d) | Size (n) |
| --- | --- | --- |
| movielens | 150 | 10,681 |
| netflix | 300 | 17,770 |
| word2vec_text8 | 200 | 71,291 |
| word2vec_wiki | 500 | 3,519,681 |

Figure 6B:
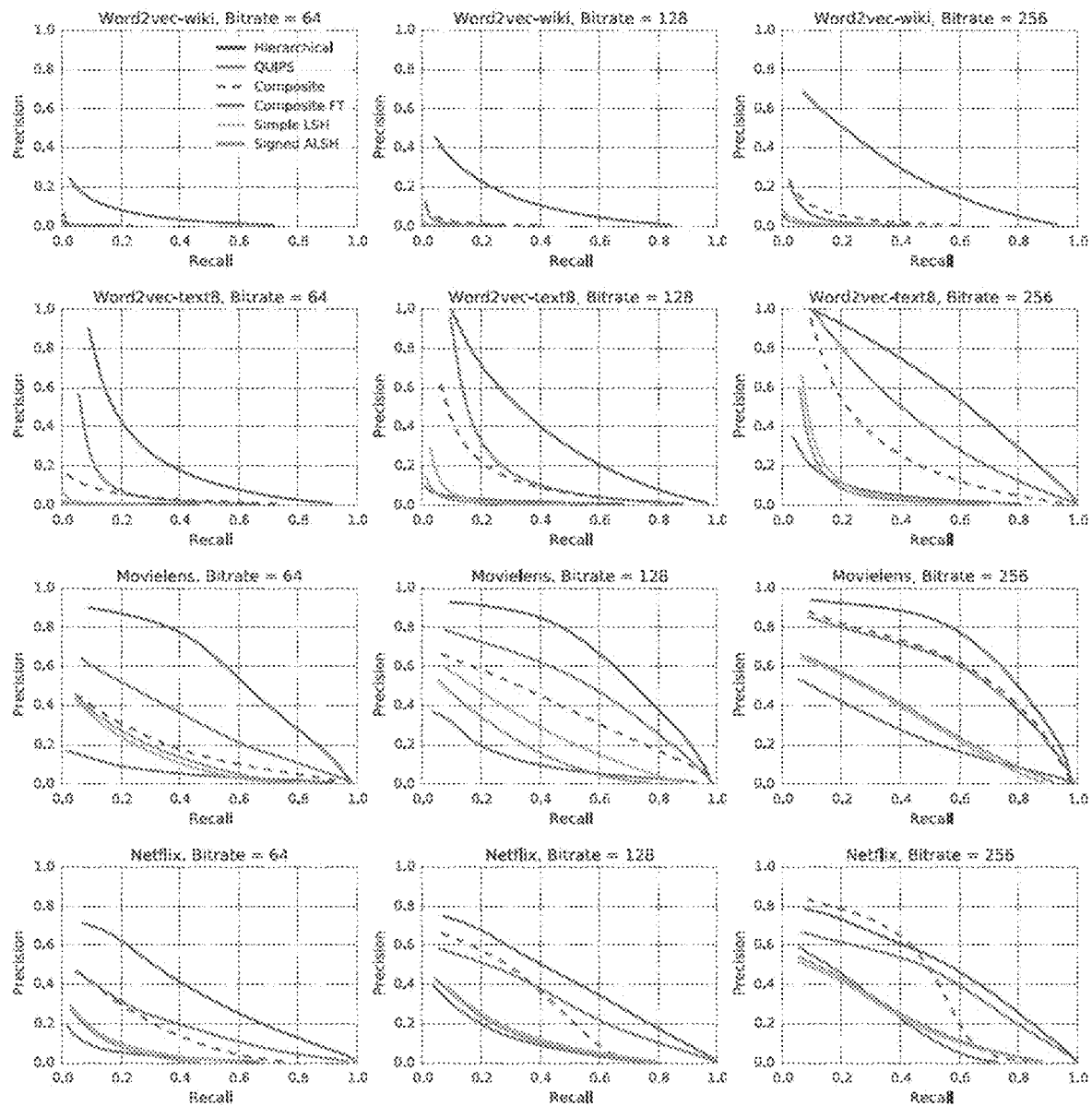
FIGS. 6A to 6D are graphs illustrating the benefits of various implementations.
Figure 6A:
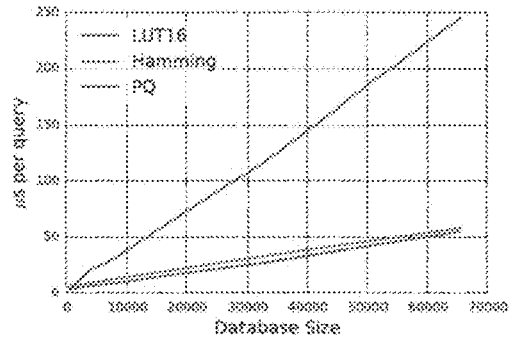

FIG. 6A illustrates a comparison of the efficiency of different distance computations. Specifically, FIG. 6A illustrates time spent (in μs) per query in a linear search of a database. In FIG. 6A hierarchical quantization using an in-register codebook lookup table (LUT16) is compared with 1) Hamming Distance of binary codes (using XOR and POPCNT instructions; and 2) Asymmetric Distance to a product quantized code (PQ, using an in-memory lookup table). All three use the same number of bits (64): Hamming uses 64-bit binary codes, PQ uses 8 subspaces with 256 quantizers in each subspace, and LUT16 uses 16 subspaces with 16 quantizers in each subspace. The timing includes both distance computation and Top-N selection. In the example of FIG. 6A, the computations were done on a 3.5 GHz Haswell machine with a single thread and CPU scaling turned off. As illustrated, LUT16 out-performs both PQ and Hamming and hierarchical quantization (LUT16) is significantly faster than PQ with in-memory lookup tables (by a factor of 5 in larger databases) and is slightly faster than Hamming distance computations.

FIG. 6B illustrates Precision/Recall curves when retrieving Top-10 neighbors on all four databases. FIG. 6B compares hierarchical quantization using in-register codebook lookup tables (Hierarchical) with four baseline methods: Signed ALSH, Simple LSH, Composite Quantization, and QUIPS. Signed ALSH is described in Shrivastava et al, "An improved scheme for asymmetric LSH," CoRR abs/1410.5410, 2014, LSH is described in Neyshabur et al, "A simpler and better LSH for maximum inner product search (MIPS)," arXiv preprint arXiv: 1410.5518, 2014, Composite Quantization is described in Du et al, "Inner product similarity search using compositional codes," CoRR, abs/1406.4966, 2014, and QUIPS is described in Guo et al., "Quantization based fast inner product search," ArXiv preprint arXiv:1509.01469, 2015. In generating the curves, ground-truth MIPS results were generated using brute force search and compared against the results of the baseline methods and hierarchical quantization in fixed-bitrate settings. FIG. 6B illustrates that hierarchical quantization tends to significantly outperform all four baseline methods, with better performance on larger databases. Thus hierarchical quantization is highly scalable.

Figure 6C:
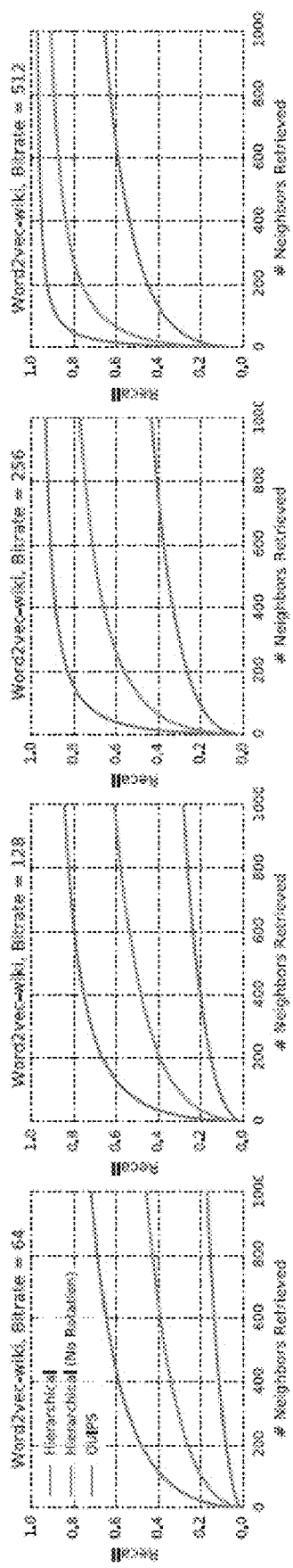
Figure 6D:
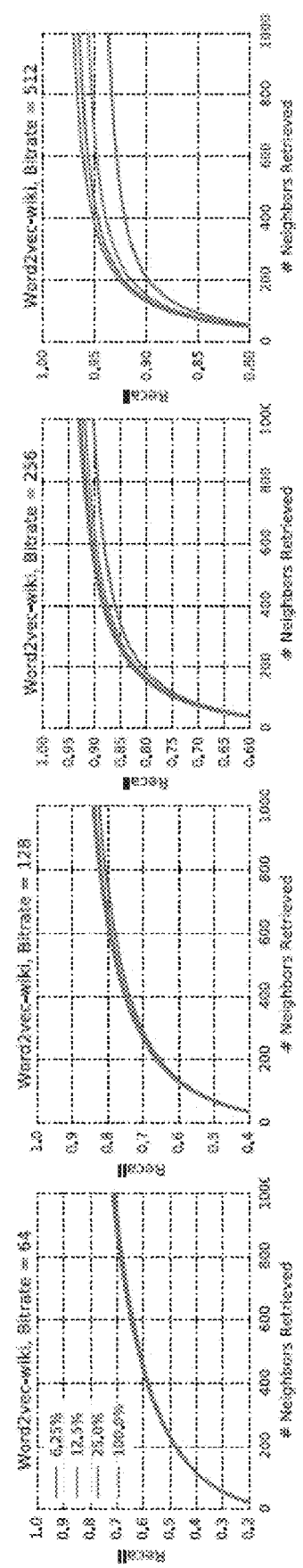

FIG. 6C illustrates recall@N for retrieving Top-10 neighbors, comparing hierarchical quantization with and without the learned rotation of the residuals on the largest database (e.g., word2vec_wiki). FIG. 6C illustrates that the learned rotation gives a significant boost to recall. FIG. 6D illustrates recall@N for retrieving Top-10 neighbors when searching different fractions of the VQ partitions on the largest database. A system using hierarchical quantization partitions the database using vector quantization into m partitions and only searches those database items that share the same VQ code words selected for the query item (e.g., at step 410 of FIG. 4). Thus, the system searches a faction of the database. This speeds processing time, but can affect recall. FIG. 6D illustrates the recall curve of the largest dataset under different search fractions t/m (where t is the number of VQ code words selected for the query item, and m is the total number of partitions in the VQ codebook). As illustrated by FIG. 6D, there is virtually no loss of recall when the search fraction is ¼ (25%) and less than a 2% loss when the search fraction is ¹⁄₁₆(6.25%). The number of partitions selected (t) can thus be adjusted to favor speed (lower t) or recall (higher t), but FIG. 6D illustrates that t can be much lower than m and still achieve accurate results.

FIG. 7 shows an example of a generic computer device 700, which may be server 110, and/or client 170 of FIG. 1, which may be used with the techniques described here. Computing device 700 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a personal computer such as a laptop computer 722, or smart phone 736. An entire system may be made up of multiple computing devices 700 communicating with each other. Other configurations are possible.

FIG. 8 shows an example of a generic computer device 800, which may be server 110 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800. Some of the computing devices may be located geographically close to each other, and others may be located geographically distant. The layout of system 800 is an example only and the system may take on other layouts or configurations.

According to one aspect, a computer system includes at least one processor and memory storing a database of quantized items. Each of the quantized items include a first entry into a first code book and a plurality of second entries into a second code book, where each of the plurality of second entries represents a respective subspace of k subspaces. The memory also includes instructions that, when executed by the at least one processor, cause the system to perform operations. The operations can include determining an entry in the first code book that is most similar to a query vector, calculating a residual vector from the entry in the first code book and the query vector, transforming the residual vector using a learned transformation, and projecting the transformed residual vector into the k subspaces. The operations can also include, for each of the quantized items having a first entry that matches the entry in the first code book that is most similar to the query vector, calculating, for each subspace, an inner product between the quantized item and the transformed residual vector, and calculating a similarity score between the quantized item and the query by summing the inner products. The operations may also include providing items with highest similarity scores in response to the query.

These and other aspects can include one or more of the following features. For example, k may be 16 and the operations may also include calculating, for each subspace, an inner product between the transformed residual vector and each entry in the second code book and storing the calculated inner products in a codebook lookup table in-register storage. Each subspace may have a corresponding register. As another example, the transformation may be jointly learned with the first code book and the second code book. In some implementations, the first code book may undergo initializing and x epochs of learning before initializing the second code book and performing the joint learning. As another example, the residual may be the difference between the entry in the first code book and the query vector. The database may be large, e.g., with millions of quantized items.

According to one aspect, a method includes clustering a data store of database items represented as high-dimensionality vectors and selecting a cluster center for each cluster and storing the cluster center as an entry in a first layer codebook. The method may also include, for each of the database items, calculating a residual based on the cluster center for the cluster the database item is assigned to, projecting the residual into subspaces, determining, for each of the subspaces, an entry in a second layer codebook for the subspace, and storing the entry in the first layer codebook and the respective entry in the second layer codebook for each of the subspaces as a quantized vector for the database item.

These and other aspects can include one or more of the following features. For example the quantized vectors may be used to determine responsive database items using a maximum inner-product search. As another example, the method may also include transforming the residual using a learned rotation prior to projecting the residual into subspaces. As another example, the method may include determining t clusters from the first codebook most similar to a query vector based on an inner product operation and calculating, for each of the t clusters, a residual of the query vector based on the cluster center for the cluster. The method may also include projecting each residual of the query into the subspaces and determining, for each database item assigned to one of the t clusters, a maximum inner product score with the query vector. The maximum inner product score is based on a sum over the subspaces of an inner product calculated between the residual for the database item and the residual of the query for the cluster assigned to the database item. The method may also include identifying from the database items assigned to one of the t clusters, database items most similar to the query vector based on the maximum inner product score. In some implementations, the database items most similar to the query vector are used to categorize an item represented by the query vector or to provide database items responsive to the query vector. As another example, the method may include transforming the residual using a learned rotation prior to projecting the residual into subspaces, wherein the learned rotation is jointly trained with parameters of the first layer codebook and the second layer codebook.

According to one aspect, a method can include partitioning vectors in a database into m partitions using vector quantization, so that each vector has an assigned vector quantization code word and calculating, for each of the vectors, a respective residual, the residual being the difference between the vector and a cluster center corresponding to the vector quantization code word. The method may further include applying product quantization to each of the residuals, producing, for each residual, a product quantization code word for each of k subspaces, storing, for each vector, the assigned vector quantization code word and k product quantization code words for the residual of the vector, and using the vector quantization code words to select a portion of the database vectors most similar to a query vector. The method may also include, for each of the database vectors in the portion, using the product quantization code words to determine database vectors from the portion most similar to the query vector.

These and other aspects can include one or more of the following features. For example, the method may also include transforming the residual using a learned rotation prior to applying product quantization. The learned rotation can be learned jointly with a codebook for the vector quantization and codebooks for the product quantization. As another example, using the vector quantization code words to select a portion of the database vectors may include performing an inner product between the query vector and each cluster center to produce a similarity value for each cluster center; and selecting t cluster centers with highest similarity values. The portion is the vectors in the database having a vector quantization code word corresponding to one of the t cluster centers. As another example, the respective residual is a first respective residual, the vector quantization code word is a first vector quantization code word, and the method may also include partitioning the first respective residuals into a plurality of second partitions using a second vector quantization, so that each vector has an assigned second vector quantization code word and calculating, for each of the first respective residuals, a second respective residual, the second residual being the difference between the first respective residual and the cluster center corresponding to the second vector quantization code word. The product quantization may be applied to the second respective residuals and the second vector quantization code word is stored with the first vector quantization code word and the k product quantization code words.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   memory storing:
      a database of quantized items, each quantized item corresponding to a respective database item that is represented by a database vector in a vector space, each of the quantized items including a concatenation of a first index into a first code book generated using vector quantization followed by a plurality of second indexes into a second code book generated using product quantization, where each of the plurality of second indexes represents a respective subspace of k subspaces, and
      instructions that, when executed by the at least one processor, cause the system to:
         determine a cluster center from the first code book that is most similar to a query vector,
         calculate a residual vector from the cluster center and the query vector,
         transform the residual vector using a learned transformation, project the transformed residual vector into the k subspaces, for each of the quantized items having a first index that corresponds to the cluster center determined for the query vector:

calculate, for each subspace, an inner product between the quantized item and the transformed residual vector, and calculate a similarity score between the quantized item and the query by summing the inner products, and provide items with highest similarity scores in response to the query.

2. The system of claim 1, where k is 16.

3. The system of claim 2, wherein the memory further stores instructions that, when executed by the at least one processor, cause the system to:

calculate, for each subspace, an inner product between the transformed residual vector and each cluster center in the second code book; and store the calculated inner products in a codebook lookup table in-register storage.

4. The system of claim 3, wherein each subspace has a corresponding register.

5. The system of claim 1, wherein the transformation is jointly learned with the first code book and the second code book.

6. The system of claim 5, wherein the first code book undergoes initializing and x epochs of learning before initializing the second code book and performing the joint learning.

7. The system of claim 1, wherein the residual is the difference between the cluster center and the query vector.

8. The system of claim 1, wherein the database has millions of quantized items.

9. A method comprising:

clustering a data store of database items represented as high-dimensionality vectors;

selecting a cluster center for each cluster and storing the cluster center as an entry in a first layer codebook; and for each of the database items:

calculating a residual based on the cluster center for the cluster the database item is assigned to, projecting the residual into subspaces, determining, for each of the subspaces, an entry in a second layer codebook for the subspace, and storing a concatenation of the entry in the first layer codebook and the respective entry in the second layer codebook for each of the subspaces as a quantized vector for the database item.

10. The method of claim 9, wherein the quantized vectors are used to determine responsive database items using a maximum inner-product search.

11. The method of claim 9, further comprising: transforming the residual using a learned rotation prior to projecting the residual into subspaces.

12. The method of claim 9, further comprising:

determining t clusters from the first codebook most similar to a query vector based on an inner product operation;

calculating, for each of the t clusters, a residual of the query vector based on the cluster center for the cluster;

projecting each residual of the query into the subspaces;

determining, for each database item assigned to one of the t clusters, a maximum inner product score with the query vector, the maximum inner product score being based on a sum over the subspaces of an inner product calculated between the residual for the database item and the residual of the query for the cluster assigned to the database item; and identifying from the database items assigned to one of the t clusters, database items most similar to the query vector based on the maximum inner product score.

13. The method of claim 12, further comprising: using the database items most similar to the query vector to categorize an item represented by the query vector.

14. The method of claim 12, further comprising: using the database items most similar to the query vector to provide database items responsive to the query vector.

15. The method of claim 9, further comprising:

transforming the residual using a learned rotation prior to projecting the residual into subspaces, wherein the learned rotation is jointly trained with parameters of the first layer codebook and the second layer codebook.

16. A method comprising:

partitioning vectors in a database into m partitions using vector quantization, so that each vector has an assigned vector quantization code word;

calculating, for each of the vectors, a respective residual, the residual being the difference between the vector and a cluster center corresponding to the vector quantization code word;

applying product quantization to each of the residuals, producing, for each residual, a product quantization code word for each of k subspaces;

storing, for each vector, the assigned vector quantization code word and k product quantization code words for the residual of the vector;

using the vector quantization code words to select a portion of the database vectors most similar to a query vector; and for each of the database vectors in the portion, using the product quantization code words to determine database vectors from the portion most similar to the query vector.

17. The method of claim 16, further comprising: transforming the residual using a learned rotation prior to applying product quantization.

18. The method of claim 17, wherein the learned rotation is learned jointly with a codebook for the vector quantization and codebooks for the product quantization.

19. The method of claim 16, wherein using the vector quantization code words to select a portion of the database vectors includes:

performing an inner product between the query vector and each cluster center to produce a similarity value for each cluster center; and selecting t cluster centers with highest similarity values, wherein the portion is the vectors in the database having a vector quantization code word corresponding to one of the t cluster centers.

20. The method of claim 16, the respective residual being a first respective residual, the vector quantization code word being a first vector quantization code word, and the method further comprising:

partitioning the first respective residuals into a plurality of second partitions using a second vector quantization, so that each vector has an assigned second vector quantization code word; and calculating, for each of the first respective residuals, a second respective residual, the second residual being the difference between the first respective residual and the cluster center corresponding to the second vector quantization code word,
wherein the product quantization is applied to the second respective residuals and the second vector quantization code word is stored with the first vector quantization code word and the k product quantization code words.

\* \* \* \* \*